United States Patent [19]

Dutt

[11] 4,196,248
[45] Apr. 1, 1980

[54] FELT HAVING REINFORCED CROSSWISE YARNS

[75] Inventor: William H. Dutt, Defreestville, N.Y.

[73] Assignee: Albany International Corp., Albany, N.Y.

[21] Appl. No.: 504,356

[22] Filed: Sep. 9, 1974

Related U.S. Application Data

[63] Continuation of Ser. No. 405,982, Oct. 12, 1973, abandoned, which is a continuation of Ser. No. 628,628, Apr. 5, 1976, abandoned.

[51] Int. Cl.² ............................................... B32B 7/00
[52] U.S. Cl. ................................... 428/225; 428/233; 428/236; 428/245; 428/257; 428/258; 428/259; 428/260
[58] Field of Search .............. 139/420, 383; 161/88, 161/89, 90, 91, 92, 98, 205; 428/225, 233, 236, 245, 257, 258, 259, 260

[56] References Cited
U.S. PATENT DOCUMENTS

| | | | |
|---|---|---|---|
| 1,811,573 | 6/1931 | Bacheldor | 139/420 X |
| 2,098,993 | 11/1937 | Barrell | 139/383 X |
| 2,506,667 | 5/1950 | Hall | 139/383 X |
| 3,248,802 | 5/1966 | Wagner | 139/383 X |

OTHER PUBLICATIONS

Woodside, "Paper Machine Felts", 1967, Title page, p. iv, pp. 181 and 182.

*Primary Examiner*—Marion E. McCamish
*Attorney, Agent, or Firm*—Kane, Dalsimer, Kane, Sullivan and Kurucz

[57] ABSTRACT

A papermakers felt utilizing reinforced yarns and suitable weaves to provide a simulated beam structure in the crosswise direction of the fabric.

10 Claims, 2 Drawing Figures

FELT HAVING REINFORCED CROSSWISE YARNS

This is a continuation of application Ser. No. 405,982, filed Oct. 12, 1973, now abandoned, which is a continuation of Ser. No. 628,628, filed Apr. 5, 1976, now abandoned.

BACKGROUND OF THE INVENTION

In the papermaking process on a paper machine various types of woven fabrics are used to aid in forming, pressing and drying the sheet of paper.

Fabrics so used are generally woven in one of two forms, either as a piece of flat material or in endless form according to known techniques. In the finished felt, the yarn which runs in the machine direction is termed the "L" (lengthwise) yarn and the yarn running across the machine is termed the "X" (crosswise) yarn. When a fabric is woven flat the warp becomes the "L" yarn and the filling is the "X" yarn. When the fabric is woven endless the warp becomes the "X" yarn and the filling becomes the "L" yarn since the fabric is woven in tubular form and the endless felt is obtained by cutting off a piece of the tube and turning it 90°.

A basic requirement for a fabric to perform properly on a paper machine is for it to exhibit a high degree of runnability. By this term is meant that the fabric must be strong enough in the lengthwise direction to carry the machine tension; flexible in the lengthwise direction to withstand continuous bending as it passes around the rolls; rigid in the crosswise direction in its own plane to withstand the forces which tend to distort the fabric in its plane and generate wrinkles caused by misalignment or roll deflection, and secondly, there must be provided a fabric which will resist diagonal distortion which will result in wrinkling if the distortion becomes severe enough.

In addition to the above, other characteristics of the fabric must be suitable to the production of the desired end product in the particular application to which the felt is directed. By the selection of particular yarns (multifilament, monofilament, staple fibers) and yarn materials or combinations thereof and the selection of weave construction, these desirable characteristics can be obtained. In the obtaining of these desirable characteristics and in the selection of yarns and construction, the designer has often been limited due to the necessity of having a resultant high degree of runnability. This has often led to the necessity of compromise among desirable characteristics.

Different criteria are utilized in obtaining the desirable lengthwise characteristics than are utilized in obtaining the desirable crosswise characteristics. Lengthwise strength and flexibility can be achieved more readily than crosswise rigidy and this is especially true when the designer is limited in the choice of yarn structure by the requirement of the fabric to perform its function on the paper machine relative to the formation of end product.

SUMMARY OF THE INVENTION

In the subject invention a multi-layer weave is utilized to displace the crosswise yarns from the neutral axis so that they can generate high tensile and compressive forces to resist bending or wrinkling. The crosswise yarns are composed of fibers selected so that the fabric can perform its function on the papermaking machine and these crosswise yarns are reinforced so as to improve the tension and compression characteristic of the crosswise yarns.

The weave is arranged so that the crosswise yarns are essentially straight in the finished structure. Also, the crosswise yarn is firmly held in the weave structure by the tightness of the weave and, if desired, a chemical treatment can be applied to the fabric binding the fabric together.

By providing such a construction there is created in the crosswise direction of the fabric a base beam construction. Any force which tends to bend the fabric in the crosswise direction generates a compressive force in the crosswise yarn layer toward the direction of bend and a tension force in the opposite crosswise layer as the fabric tends to bend around the neutral axis. This beam construction gives the fabric a high resistance to bending forces.

DESCRIPTION OF THE PREFERRED EMBODIMENT

In the Figs. an embodiment of the invention is shown by way of example. In this example a papermakers felt is provided which is able to withstand the high temperatures in the dryer section of a paper machine. The fabric is constructed of materials which can withstand high temperatures.

The lengthwise yarns 10, 20, 30 and 40 are 1200 denier/2 ply multifilament Nomex (duPont registered trademark for a nylon fiber) yarn. This yarn which can withstand high temperatures has also the properties of strength and flexibility. The lengthwise yarns were combined with crosswise yarns in a two-layer weave as shown in the Figures.

Figure 1:
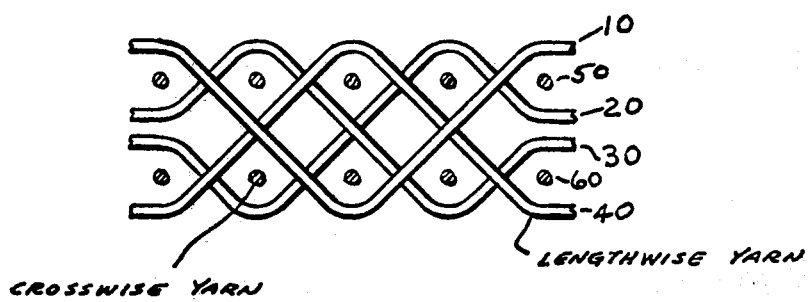
FIG. 1 is a cross-sectional view of the lengthwise weave section in a fabric constructed in accordance with the teachings of this invention.
Figure 2:
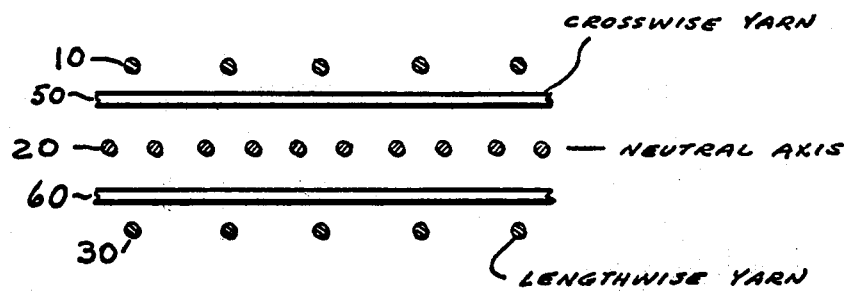
FIG. 2 is a cross-sectional view of the crosswise weave section of the fabric shown in FIG. 1.

The weave being a multi-layer weave, results in the crosswise yarns 50 and 60 being displaced from the neutral axis, as shown in FIG. 2. Displacement allows development of tensile and compressive forces during bending which are resisted by the crosswise yarns 50 and 60 in order to provide good guidability and runnability.

A material which can withstand heat and which will provide the desired surface characteristic must be used in the crosswise yarns. Such a material is asbestos. Asbestos yarns alone however lack sufficient rigidity to operate on a paper machine as crosswise yarns. Fourteen cut, 2 ply asbestos yarns were twisted about an 0.008" monel wire to develop in the crosswise yarns good compression and tension characteristics.

In order to have a firm structure, it is necessary that the crosswise yarns be firmly held in the weave structure. This is accomplished either by the tightness of the weave or by a chemical treatment applied to the fabric binding the fabric together. A combination of weave tightness and chemical treatment can also be utilized.

For certain applications the tight weave is sufficient. In other applications chemical treatments are used, which treatments are of the type commonly known in the art.

In one application the structure described above, after weaving was treated as follows:

A resorcinol-formaldehyde resin was applied at pick up levels of 5 to 10%, by conventional equipment and dried at temperatures ranging from 200°–220° F. for 10 to 20 minutes. This was followed by a curing cycle at temperatures ranging from 350° to 375° F. for a period of time varying between 10 and 20 minutes. Elastomeric material, e.g., polyacrylic, was added in percentages by weight up to 50% of the total formulation to modify the flexibility and abrasion resistance of the treatment.

Urethane coating resins may also be applied at pick up ranging from 5 to 10% dry weight of the original fabric. Typical heat curves, after drying at 200°–210° F. range from 350°–375° F. for 15 to 25 minutes.

I claim:

1. A papermakers felt which comprises a woven multilayer, single-ply fabric in which first crosswise yarns are reinforced by twisting in combination with second crosswise yarns having superior tensile and compressive strength in comparison to said first crosswise yarns and in which the crosswise yarns are displaced from the neutral axis of said fabric by lengthwise yarns common to each layer and means for securing the crosswise and lengthwise yarns against relative movement.

2. A papermakers felt according to claim 1 wherein said crosswise yarns are straight.

3. A papermakers felt according to claim 1 wherein said lengthwise yarns are flexible and the crosswise yarns are straight and substantially rigid.

4. A papermakers felt according to claim 1 wherein said means for securing the crosswise yarns and the lengthwise yarns from relative movement comprises the tightness of the weave.

5. A papermakers felt according to claim 1 wherein said means of securing the crosswise yarns and the lengthwise yarns from relative movement comprises an adhesive bond between said crosswise yarns and said lengthwise yarns at crossover points.

6. A papermakers felt according to claim 5 wherein the adhesive is a resorcinol-formaldehyde resin.

7. A papermakers felt according to claim 5 wherein the adhesive is a polyurethane resin.

8. A papermakers felt according to claim 1 wherein said lengthwise yarns are multifilament nylon yarn and said crosswise yarns are asbestos yarn twisted about monel wire.

9. A papermakers felt which comprises;
   a woven multilayer, single-ply fabric having;
   (i) multiple layers of crosswise yarns wherein each yarn of each layer is substantially in vertical alignment with a corresponding yarn of the adjacent layer, and each crosswise yarn is rigid and straight;
   (ii) flexible lengthwise yarns which are common to each of said multiple layers; and
   (iii) an adhesive bond between said crosswise yarns and said lengthwise yarns at crossover points.

10. A papermakers felt according to claim 9 wherein said crosswise yarns are asbestos yarn twisted about monel wire and said lengthwise yarns are multifilament nylon.

* * * * *

UNITED STATES PATENT AND TRADEMARK OFFICE
CERTIFICATE OF CORRECTION

PATENT NO. : 4,196,248
DATED : April 1, 1980
INVENTOR(S) : William H. Dutt

It is certified that error appears in the above-identified patent and that said Letters Patent is hereby corrected as shown below:

Title Page,
Item [63] Related U.S. Application Data, please change from :
"[63] Continuation of Ser. No. 405,982, Oct. 12, 1973, abandoned, which is a continuatio of Ser. No. 628,628, Apr. 5, 1976, abandoned.", to -- [63] Continuation of Ser. No. 405,982, Oct. 12,1973, abandoned, which is a continuation of Ser. No. 628,628, Apr. 5, 1967, abandoned.--

Signed and Sealed this

Twenty-ninth Day of June, 2004

JON W. DUDAS
*Acting Director of the United States Patent and Trademark Office*